United States Patent [19]
Taylor

[11] Patent Number: 5,685,329
[45] Date of Patent: Nov. 11, 1997

[54] DUAL INLINE RUPTURE PIN RELEASE AND RESEATING SPRING LOADED RELIEF VALVE

[76] Inventor: Julian S. Taylor, 8502-A SW. 8th, Oklahoma City, Okla. 73128

[21] Appl. No.: 539,255

[22] Filed: Oct. 5, 1995

[51] Int. Cl.⁶ ................................................. F16K 17/14
[52] U.S. Cl. ........................................ 137/71; 137/512.2
[58] Field of Search ............................ 137/70, 71, 512.2

[56] References Cited

U.S. PATENT DOCUMENTS

| | | | |
|---|---|---|---|
| 2,098,399 | 11/1937 | Munson | 137/71 X |
| 2,575,944 | 11/1951 | Conner | 137/512.2 X |
| 3,595,263 | 7/1971 | Greenlaw | 137/491 |
| 3,742,926 | 7/1973 | Kemp | 137/512.1 X |
| 3,776,251 | 12/1973 | Trubman | 137/71 |
| 3,916,946 | 11/1975 | Motzer | 137/512.1 |
| 4,317,470 | 3/1982 | Taylor | 137/71 X |
| 4,549,565 | 10/1985 | Short, III | 137/71 |

OTHER PUBLICATIONS

Catalog number 306 dated Nov. 1989 and distributed by Crosby Valve and Gage Company of 43 Kendrick Street, Wrentham MA.

*Primary Examiner*—John Rivell
*Attorney, Agent, or Firm*—Robert K. Rhea

[57] ABSTRACT

A toxic and corrosive fluid monitoring relief valve is formed by a valve body containing inline fluid pressure relief valves respectively opened in response to a first and a second fluid pressure. Fluid pressure in excess of the first fluid pressure opens the first valve by rupturing a pin normally maintaining the first valve closed to allow fluid contained by the valve body, to act on the second downstream relief valve. The second downstream valve being spring-loaded to open at the second predetermined fluid pressure and exhaust fluid pressure in a blow down action and reclose the valve when the excess fluid pressure has been reduced.

18 Claims, 7 Drawing Sheets

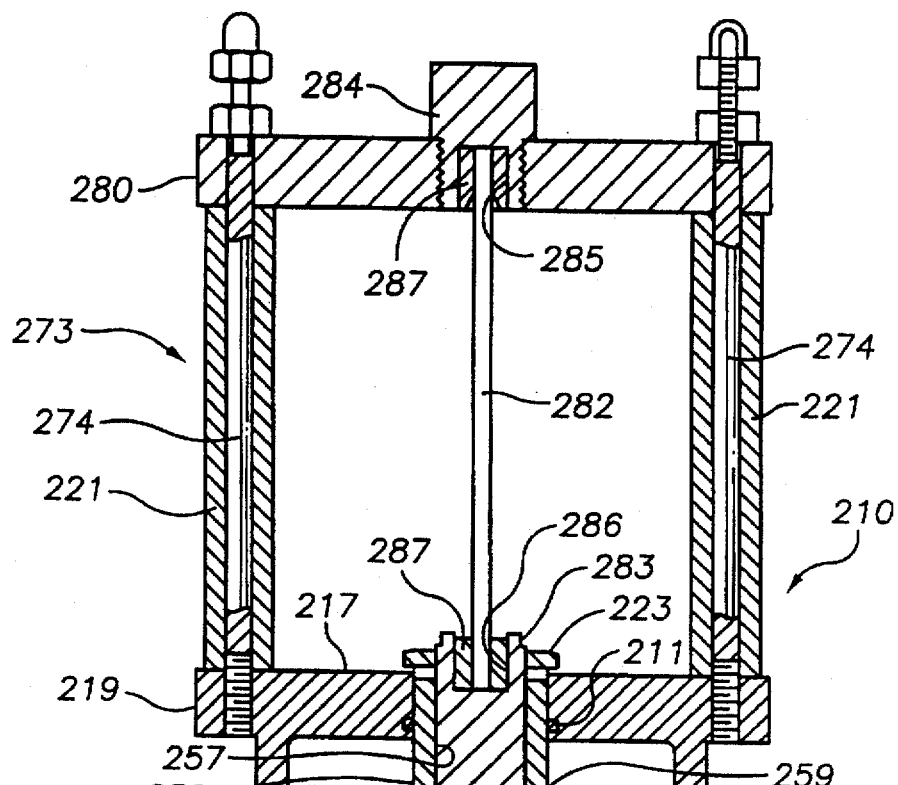
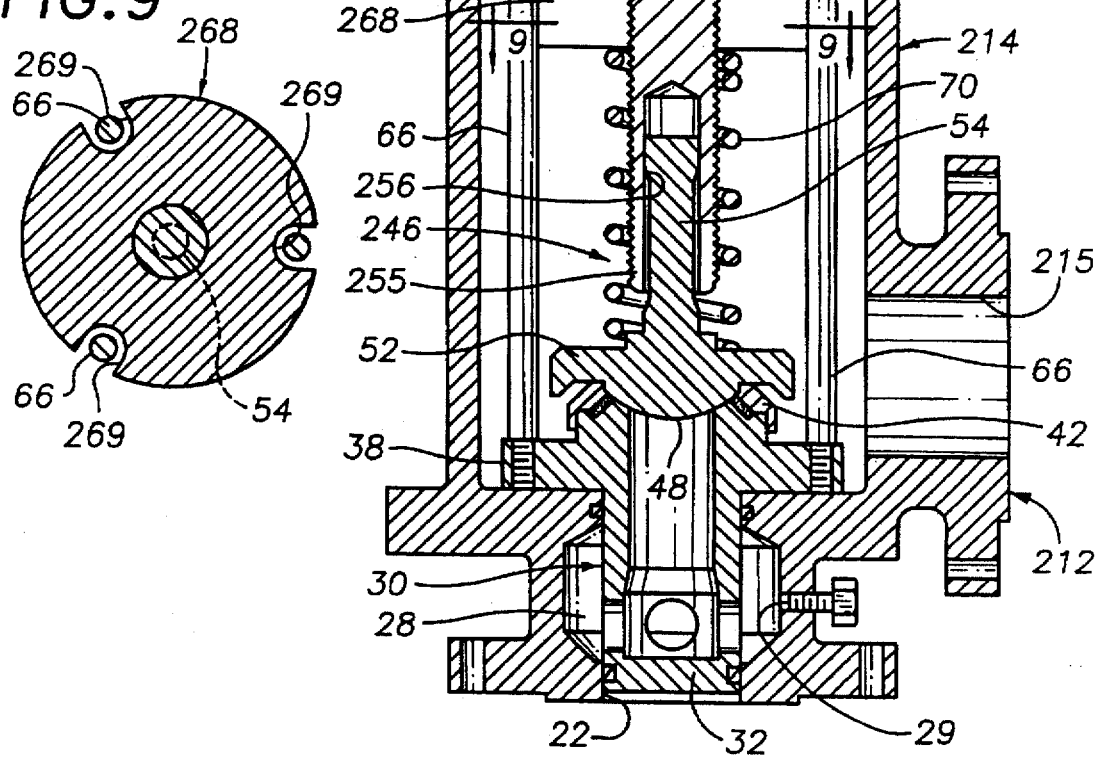

5,685,329

DUAL INLINE RUPTURE PIN RELEASE AND RESEATING SPRING LOADED RELIEF VALVE

BACKGROUND OF THE INVENTION

1. Field of the Invention

This invention relates to relief valves, and more particularly to a combination spring-loaded and rupture pin fluid pressure relief valve.

An over pressure relief valve is necessary for vessels used in the transportation and storage of chlorine or other dangerous commodities. It is essential that such a relief valve have its components isolated from the fluid being monitored for over pressure, and to provide an indication when an over pressure has been initially encountered, and which will also prevent fugitive emissions. This invention provides such a valve.

2. Description of the Prior Art

The most pertinent prior art is believed disclosed by catalog number 306 dated November 1989 and distributed by Crosby Valve and Gage Company of 43 Kendrick Street, Wrentham, Mass. 02093. This catalog illustrates and describes a corrosive fluid high pressure protecting relief valve featuring diaphragm seals at both the inlet and outlet ports of the valve to assure no corrosive fluid contacts internal working parts. The inlet port is also protected by a tension breaking pin which breaks with the rupture of the inlet port diaphragm releasing fluid pressure in the valve to a spring-loaded valve which instantly pops full open and fractures the downstream outlet port diaphragm permitting free discharge through the valve to atmosphere. The spring-loaded valve reseats after a normal blowdown.

U.S. Pat. No. 3,595,263 issued Jul. 27, 1971, to the assignee, Crosby Valve and Gage Company for Pilot Actuated Unbalanced Piston Relief Valve, is believed a good example of the further state-of-the-art. This patent discloses a relief valve member normally held in seated position by the net force acting on two opposed surfaces having unequal effective areas, both surfaces subject to the pressure of the vessel to be relieved. The larger of these areas forms a control chamber that may be vented by action of the pilot release valve which in turn operates a shuttle valve by a passage connecting the pilot valve outlet with a control member which continuously maintains a control connection from the vessel to the pilot valve. The shuttle valve opens a passageway to the atmosphere, thus permitting the relief valve member to move toward the control chamber for the full opening of the valve.

This invention is believed distinctive over both valves as described hereinabove by employing a rupture pin release sliding piston valve as a pilot valve set to open at a predetermined pressure and release fluid to a downstream spring-loaded valve opening at a second higher fluid pressure value for relieving the vessel being monitored.

SUMMARY OF THE INVENTION

A generally hollow valve body having an inlet port and an outlet port including an outlet port apertured cap is provided with an annular shoulder on its inner periphery adjacent its respective end portion downstream from the inlet port. A piston valve having seals at its respective end portions seals at one end portion with the wall forming the valve body to close the inlet port. A valve seats on the seal at the other end of the piston and includes a valve stem telescopically received by a socket in a valve stem follower having a peripheral surface opposite the piston slidably contacting the inner periphery of the valve body. A compression spring and spring adjuster surrounds the telescoped valve stem and follower for normally maintaining the valve seated on the adjacent piston valve seal. A plurality of struts interposed between the valve stem follower and an annular shoulder on the piston moves the valve stem follower with longitudinal movement of the piston.

In one embodiment, a cage projecting downstream from the follower beyond the valve body downstream annular shoulder supports one end of a pin, having its other end portion secured to the last named shoulder.

In another embodiment the pin is axially supported at its ends by the valve stem follower and apertured body cap, respectively.

In a third embodiment, the downstream end portion of the pin is supported by a pin cage including a plate supported by a plurality of posts connected with the valve body opposite the inlet port. The valve body having a lateral outlet port connected with a vessel or piping for control of hazardous fluid during blow down following a fluid passageway opening through the valve.

The principal objects of this invention are to provide an over pressure hazardous fluid material monitoring dual relief valve which initially opens a first over pressure pilot valve, below a critical pressure of by initially rupturing a tension pin; or collapsing a collapsible pin to provide visual indication of an initial over pressure release of the valve; and, to provide a second spring-loaded relief valve which opens at a critical pressure to blow down the over pressure to atmosphere or to a conductor connected with the valve outlet port and reclose when the over pressure has been reduced.

BRIEF DESCRIPTION OF THE DRAWINGS

FIG. 8 is a vertical cross sectional view of a third embodiment, similar to FIG. 6, illustrating a collapsible pin and a compression spring maintaining the first and second valves in closed position; and, FIG. 9 is a horizontal cross sectional view taken substantially along the line 9—9 of FIG. 8; and, FIG. 10 is a view similar to FIG. 7 illustrating, by solid lines, the first valve in open position and illustrating, by dotted lines, the second valve in open position.

DESCRIPTION OF THE PREFERRED EMBODIMENTS

Figure 1:
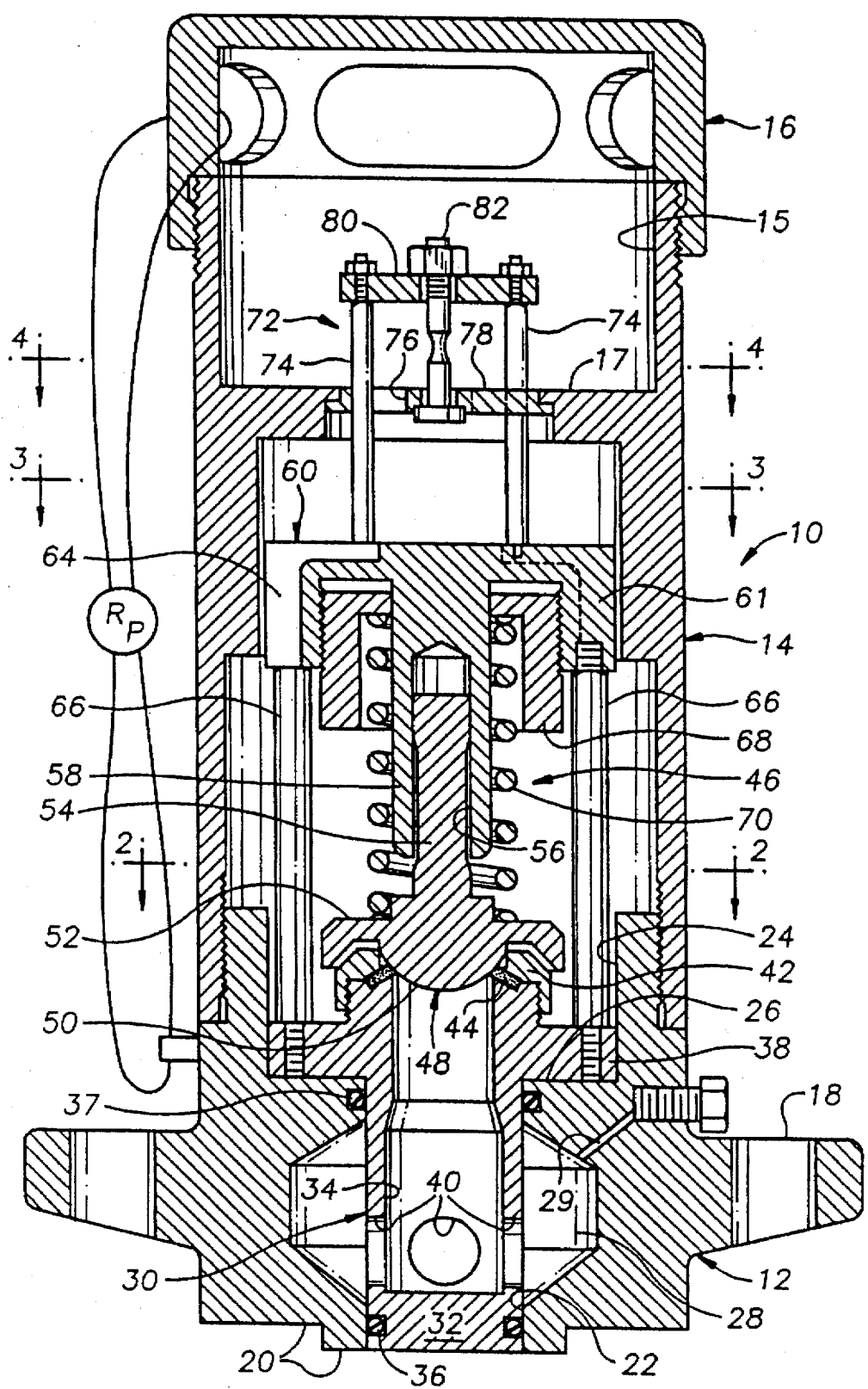
FIG. 1 is a vertical cross section of a view of one embodiment utilizing a breaking pin and a compression spring for respectively maintaining a first and a second valve closed.

Like characters of reference designate like parts in those figures of the drawings in which they occur.

In the drawings:

The reference numeral 10 indicates the valve as a whole comprising a valve base 12 having a sleeve 14 connected with one end thereof and forming an outlet port 15 at its end opposite the valve base. The downstream end of the sleeve threadedly receives an apertured wall sleeve cap 16. The inner wall surface of the downstream end portion of the sleeve is provided with a flange-like annular shoulder 17. The valve base is provided with an outstanding bolt flange 18 and a step diameter end 20 for metal to metal contact with a vessel, not shown, containing fluid to be monitored. The valve base is centrally bored, as at 22, forming an inlet port and counter-bored, as at 24, from its downstream end for forming a downstream facing shoulder 26. The valve base bore 22 is circumferentially enlarged between its inlet end and the annular shoulder 26 to form a chamber 28 for the purposes presently explained. A normally plug closed lateral bore 29 is formed through the valve base wall for the purpose presently explained.

A first or pilot valve means includes an elongated piston valve 30 having one closed end 32 is longitudinally slidable in the valve base bore 22. The piston is axially bored, as at 34, from its downstream end and provided with a plurality (3) of wall ports 40 adjacent its closed end 32 to provide communication between the bore 34 and chamber 28 to form a piston fluid passageway. An O-ring seal 36 surrounding the closed end of the piston and a second O-ring seal 37, supported by the wall of the valve base bore 22, seals the wall of the piston with the valve base inlet bore 22 for the purpose believed readily apparent. The piston is provided with an outstanding flange 38 normally abutting the valve base shoulder 26. The downstream end of the piston threadedly receives a valve seat 42 impinging an annular valve seal against the downstream end of the piston to form a soft seat 44 for a valve as will now be explained.

Figure 3:
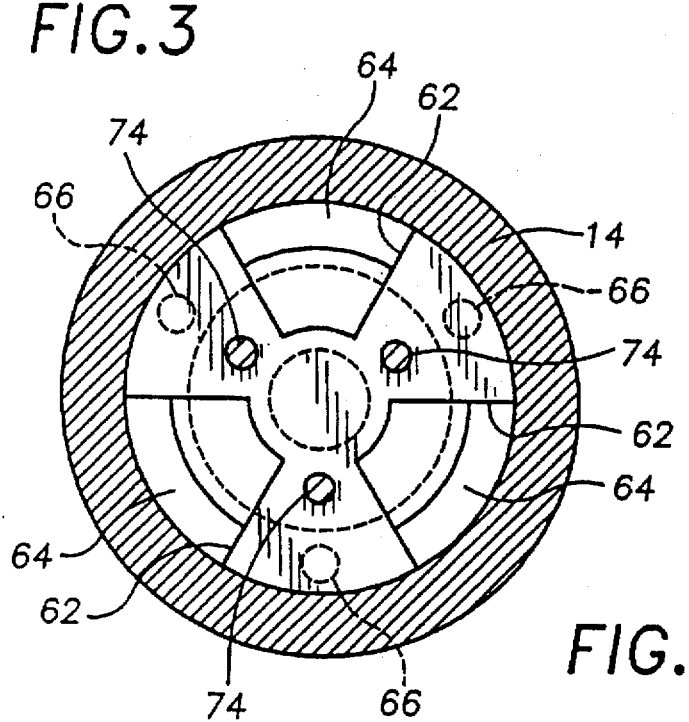
FIGS. 2, 3, and 4 are horizontal cross sectional views respectively taken substantially along the lines 2—2, 3—3 and 4—4 respectively of FIG. 1.

A second or spring-loaded valve means 46 normally seals with the piston annular seat 44 to close the downstream end portion of the piston. The valve means 46 includes a valve 48 having a substantially hemispherical end surface 50 sealing with the annular seat 44. The valve 48 is provided with an outstanding annular flange 52 which overlies the valve seat 42 and further includes a valve stem 54 telescopically received by a socket 56 formed in the stem 58 of a substantially T-shaped valve stem follower 60. A peripheral wall formed by the bar 61 of the T-shape 60 is longitudinally slidably received by the wall forming the bore of the sleeve 14. As shown by FIG. 3, three segments of the wall and top surface of the T-bar 61 are cut away, as at 62, to form three passageways 64 for fluid communication through the sleeve 14 across the position of the valve follower T-bar 61 for the purposes presently explained. The valve follower 60 is maintained in predetermined vertical spaced relation with respect to the sleeve downstream annular shoulder 17 and piston flange 38 by a plurality (3) of struts 66 interposed between and secured to the piston flange 38 and T-bar 61 respectively. The depending surface of the T-bar describes a cylindrical recess around the stem 58 of the T-shape for threadedly receiving a spring adjuster 68. A compression spring 70 surrounds the telescoping stems between the adjuster 68 and the valve flange 52, and its compression is adjusted by angular rotation of the spring adjuster 68. The spring 70 normally maintains the valve 48 seated on the annular soft seat 44.

Figure 4:
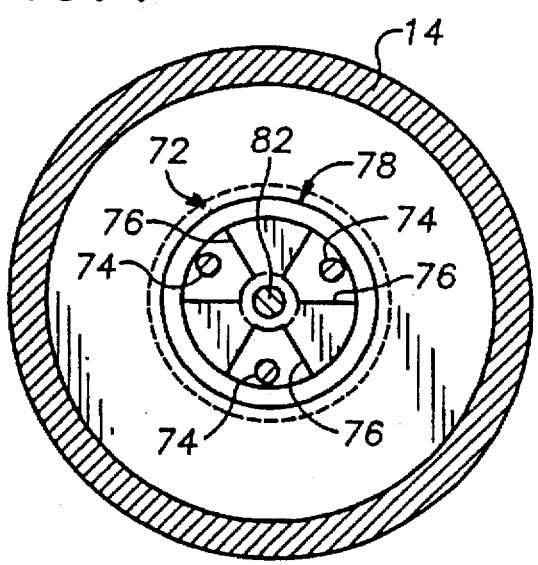
Figure 2:
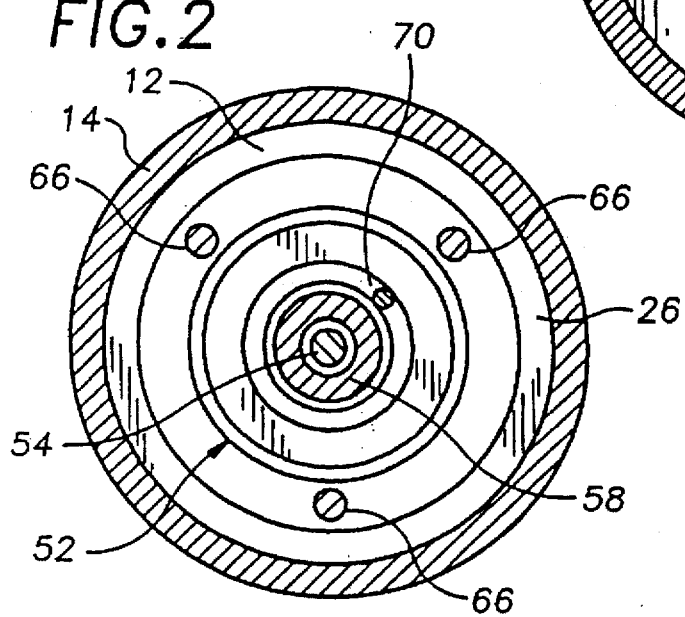

Referring also to FIG. 4, a pin means 72 normally maintains the piston flange 38 in contact with the upstream annular shoulder 26 and the piston 30 in inlet port closed position. The pin means 72 comprises a plurality (3) of upstanding rods 74 secured at one end, in circumferentially spaced relation to the bar 61 of the T-shaped follower 60 and project through a like plurality of radial apertures 76 formed in a centrally bored disk 78 cooperatively secured to the inner periphery of the sleeve shoulder 17 and supporting at their upper limit a centrally bored plate 80. A bolt-like breakable tension pin 82 having a predetermined axial failure value less than a second predetermined fluid pressure value, extends axially through the central bore of the disk 78 and plate 80 for normally preventing upward movement, as viewed in the drawings, of the piston 30 and spring-loaded valve assembly 46.

Figure 5:
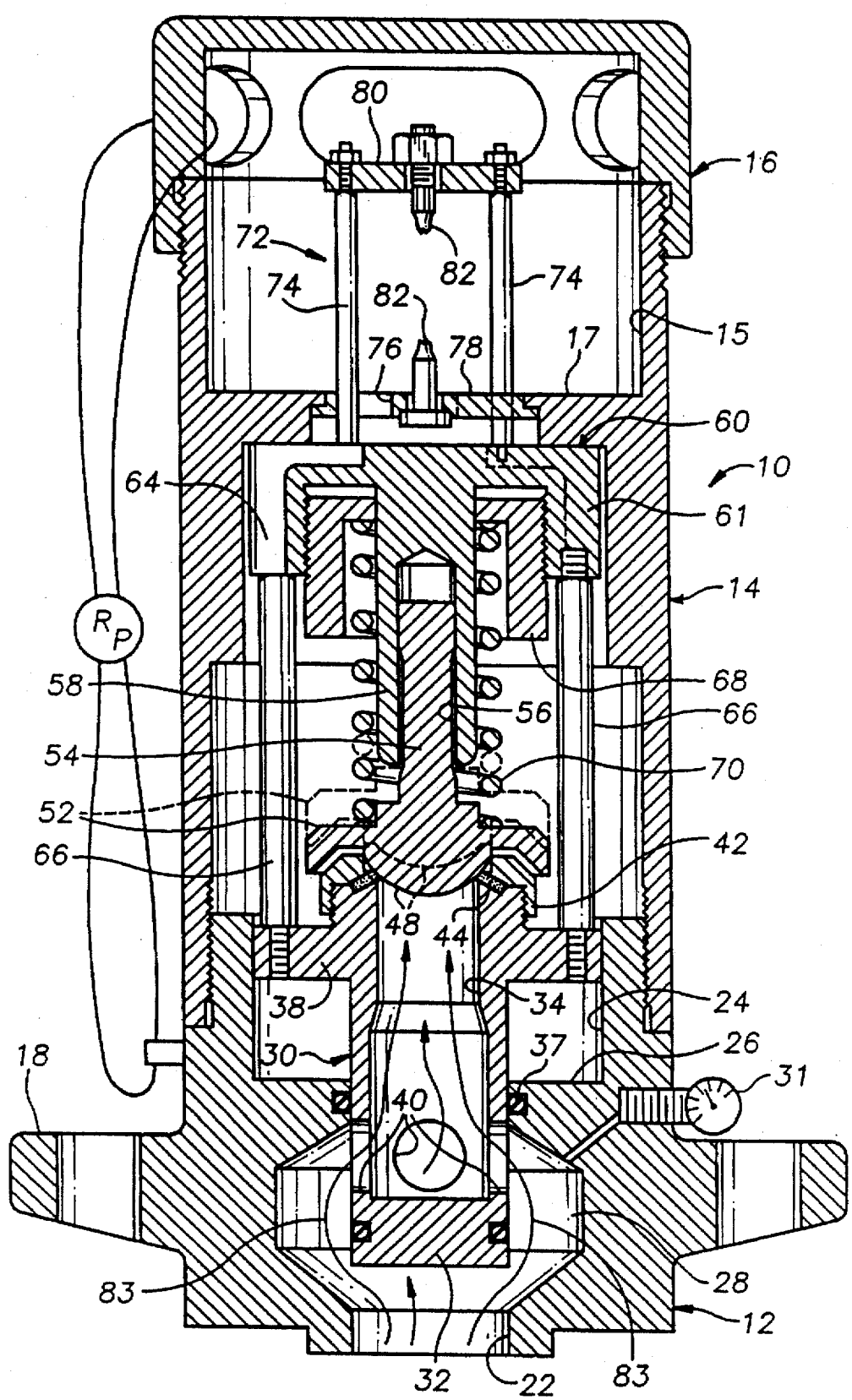
FIG. 5 is a vertical cross sectional view similar to FIG. 1, illustrating, by solid lines, the first valve in open position, and illustrating, by dotted lines, the second valve in open position.

In the operation of the embodiment 10, and referring also to FIG. 5, when excess fluid pressure above the first predetermined value acting on the closed end 32 of the piston breaks the tensile link 82, the piston 30 and spring loaded valve assembly 46 move, as a unit, toward the valve outlet port 15 and abuts the T-bar 61 against the upstream surface of the sleeve shoulder 17. This allows fluid, indicated by the arrows 83, to enter the inlet port 22 and the piston bore 34 through its apertures 40 and apply fluid pressure to the upstream face of the valve 48. However, no fluid is exhausted to the atmosphere since the spring-loaded valve means 46, having a second fluid pressure opening value greater than the frangible link 82, maintains the valve 48 closed.

A desirable feature of the invention is that the plug normally closing the valve base lateral bore or passageway 29 may be replaced by a pressure gauge 31 (FIG. 5) for visual indication of fluid pressure, if present, in the valve base recess 28. The pin means 72 being elevated toward the sleeve cap apertures permits visual indication that the frangible link 82 has failed. The passageway 29 may also be used to apply fluid pressure, as from a compressed air source, not shown, through the threaded plug port to test the opening pressure of the valve spring-loaded assembly 46 when the piston 32 is on seat.

If the fluid pressure in the vessel continues its increase and exceeds a second predetermined value and the setting of the spring 70, the fluid pressure bearing against the hemispherical surface of the valve 48 unseats the valve, as illustrated by dotted lines FIG. 5, thus opening the piston fluid passageway to the atmosphere through the apertures of sleeve cap 16.

After a blow down of the excess pressure, the setting of the spring 70 forces the valve 48 to reseat on the valve seal 44.

Figure 6:
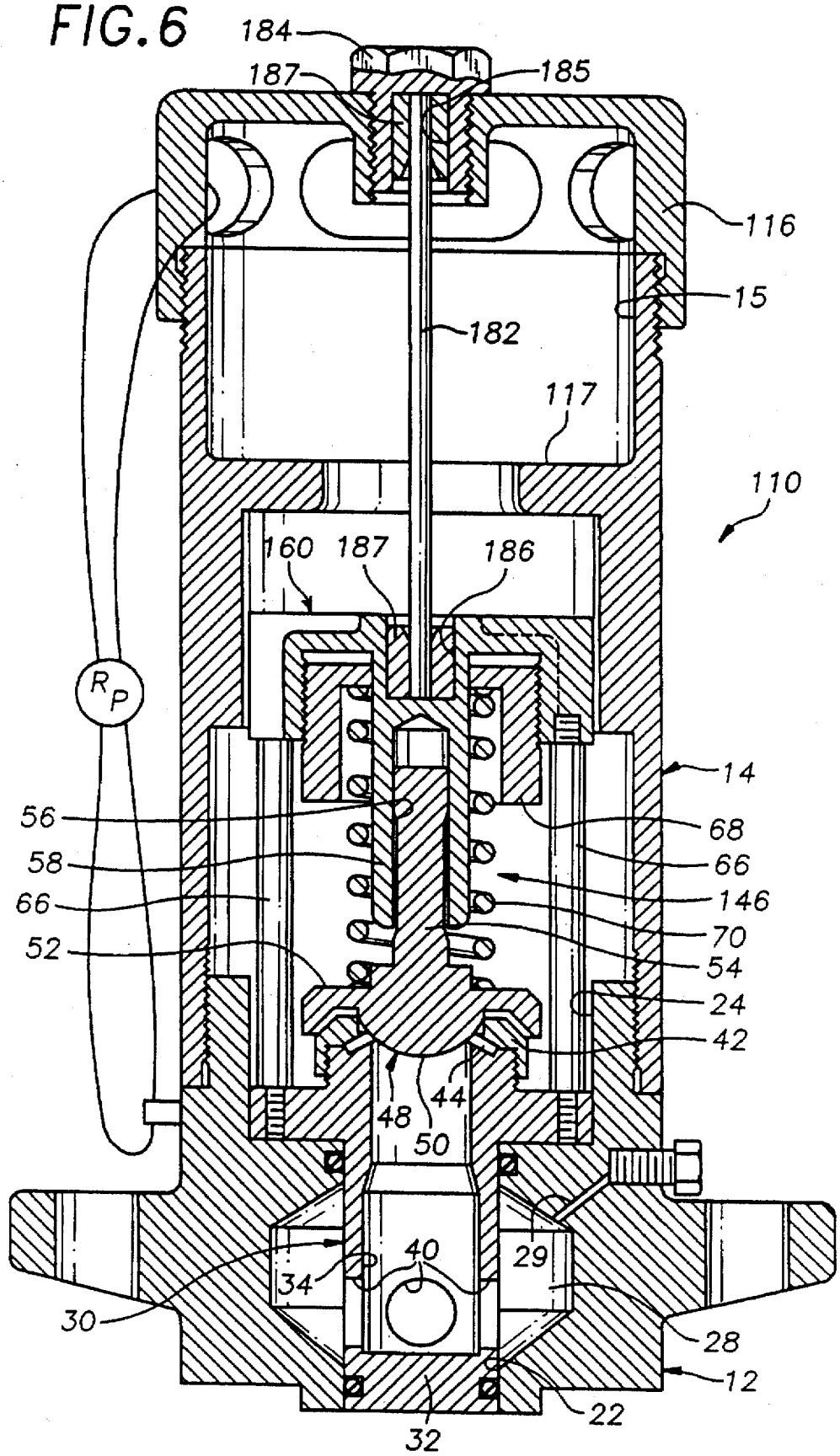
FIG. 6 is a vertical cross sectional view similar to FIG. 1, illustrating a collapsible pin and a compression spring of a second embodiment maintaining the first and second valves in closed position.
Figure 7:
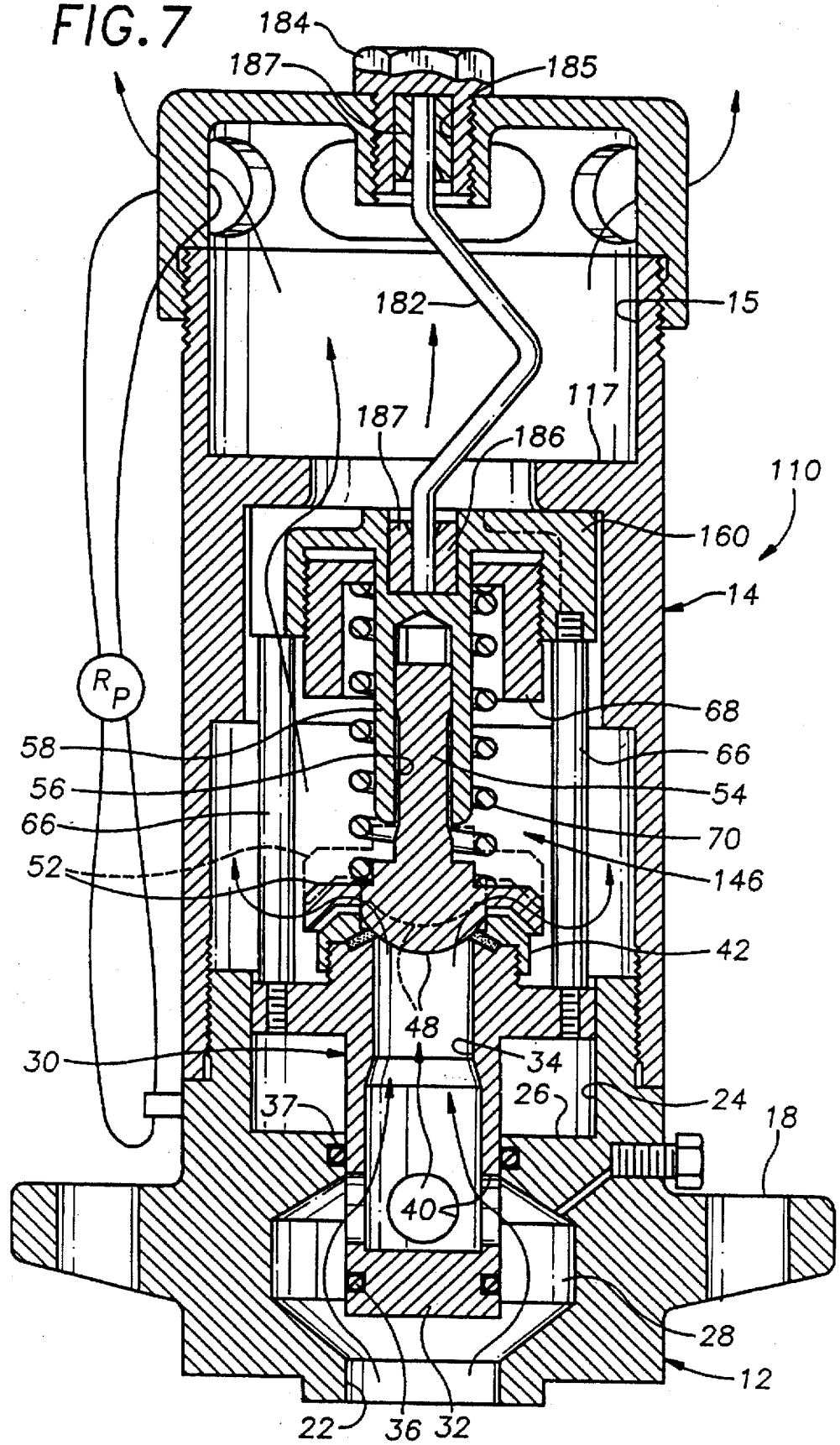
FIG. 7 is a view similar to FIG. 5 illustrating, by solid lines, the first valve in open position by collapse of the rupture pin and illustrating, by dotted lines, the second valve in open position.
Figure 10:
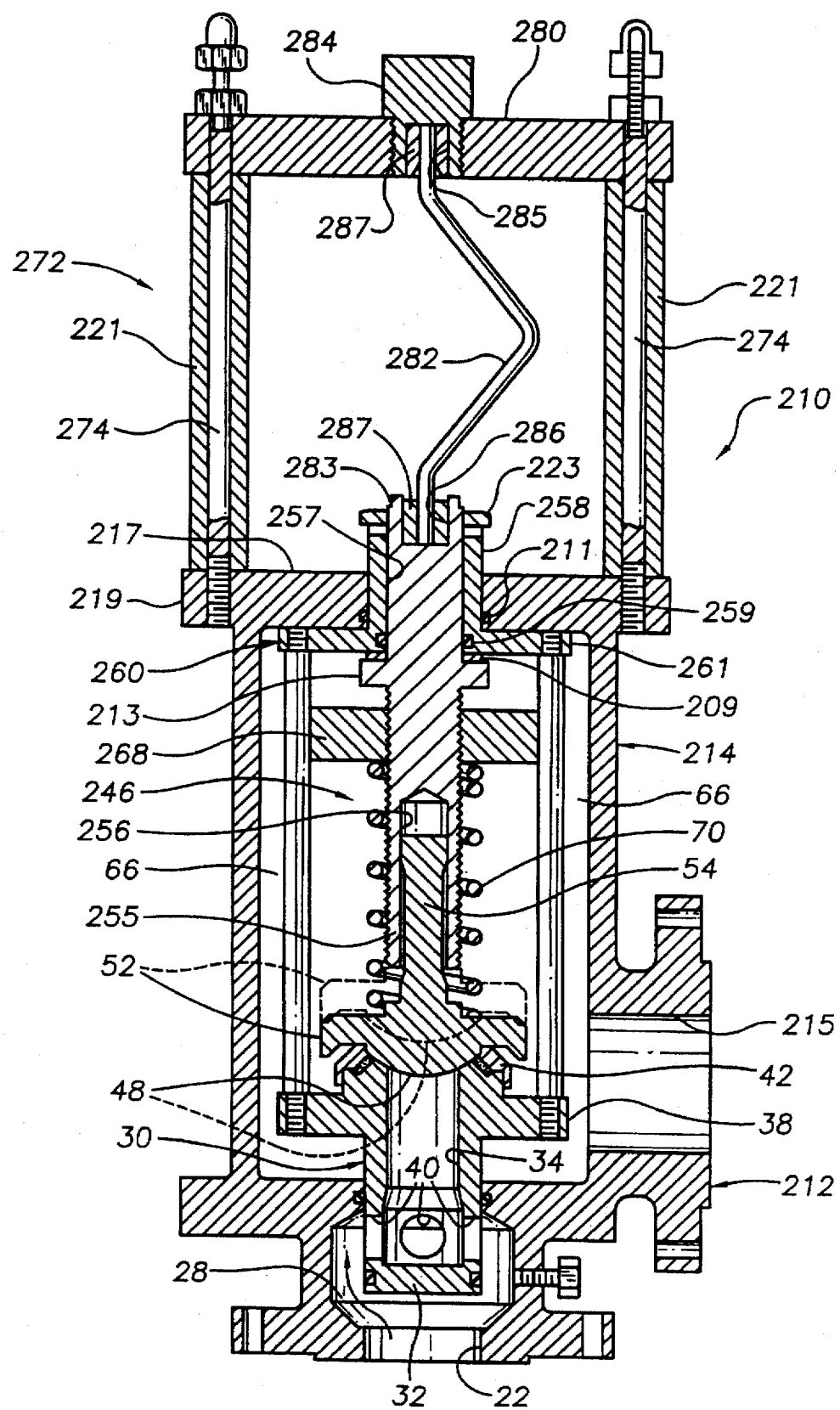

Referring also to FIGS. 6 and 7, the reference numeral 110 indicates a second embodiment of the valve in which parts identical with the valve 10 bear identical numerals, and modified or different parts are in the 100 series.

The apertured wall end cap 116 is axially drilled for threadedly receiving a plug 184. The confronting ends of the plug 184 and the top surface of the valve follower 160 are axially drilled a selected depth, as at 185 and 186, for receiving a pair of centrally bored bushings 187. The bushings 187 nest respective end portions of a collapsible pin 182 which buckles or collapses under a predetermined axial failure value in accordance with Euler's Law for cylindrical columns.

The principal advantage of the valve 110 with respect to the valve 10 is the use of the collapsible pin 182 which provides accurate monitoring of the pressure setting at which the piston valve 30 initially opens.

Operation of the valve 110 is substantially identical with the valve 10 in which initial opening of the piston valve 30 in response to a predetermined pressure value, acting against the closed end 32 of the piston and inturn on the slender column 182 collapses or buckles the latter to allow the piston valve 30 and spring-loaded valve assembly 146, to move as a unit toward the body annular shoulder 117 (FIG. 7). If fluid pressure acting on the face of the valve 48 continues to rise and reaches a second predetermined value, the valve 48 unseats, as illustrated by dotted lines (FIG. 7), to blow down fluid pressure through the sleeve body exit port 15 until the fluid pressure is reduced to a value below the second predetermined value and the spring 70 reseats the valve 48.

Referring now to FIGS. 8 and 9, a third embodiment of the valve is indicated by the numeral 210. In this embodiment, valve components which are unchanged with respect to the valve 10 bear identical reference numerals and those components which are new or modified bear numerals in the 200 series.

The valve base 212 is provided with a lateral outlet port 215 which communicates with the interior of the valve sleeve portion 214 downstream from the position of the valve 48. The valve sleeve 214 being terminated at the downstream position of its inner annular shoulder 217 which is circumferentially enlarged to form an outstanding flange 219 for the purposes presently explained.

The T-shaped valve follower 260 comprises a centrally bored T-bar portion 261 forming an annular shoulder with its stem portion 258 inverted from the position shown by FIG. 1 and having a central through bore 257 with the periphery of the T-stem 258 sealed by an O-ring 211 with the inner wall surface of the downstream annular shoulder 217 for cooperating with the upstream annular shoulder seals 36 and 37, insuring the equal area confronting surfaces of the annular shoulders balance out any fluid pressure contained by the valve body.

The T-shaped follower shoulder 261 is similarly connected with the piston annular flange 38 by the plurality of struts 66 for maintaining the shoulder 261 in selected spaced relation with respect to the upstream surface of the shoulder 217.

A shaft 255 telescopically receives the valve stem 54 in its socket 256, and is elongated at its other end portion to extend downstream through the bore 257 of the T-shaped follower stem 258 provided with wrench flats at its downstream end, and is sealed by an O-ring 259. An annular flange 213 integral with the telescoping shaft 255 is disposed adjacent the upstream end of the T-shaped member shoulder 261. A bearing ring 209 is interposed between the flange 213 and adjacent surface of the shoulder 261 for the purpose presently explained. A spring compression adjuster 268, having a like plurality of circumferentially spaced recesses 269 slidably contacting the struts 66, is threadedly connected with the periphery of the valve stem telescoping shaft 255 for the reason presently explained.

The compression spring 70 is adjusted for the embodiment 21 by loosening the nut 223, holding the T-bar stem 258 stationary, as by a spanner wrench, not shown, and angularly rotating the shaft 255 by a wrench, similarly not shown, on flats 283 to threadedly move the adjuster 268 toward or away from the spring 70.

Pin cage means 272 is connected with the annular flange 219 and similarly comprises a plurality (3) of rods 274 threadedly connected at one end with the flange 219 and projecting at their other end portion through a centrally apertured plate 280 and secured by nuts impinging rod surrounding sleeves 221 between the flange 219 and upstream surface of the plate 280.

The central bore of the plate 280 similarly receives a plug 284. The confronting surfaces of the plug 284, and telescoping stem 258 are axially drilled, as at 285 and 286, for receiving a pair of cylindrical bushings 287 respectively receiving end portions of a collapsible pin 282 similarly having a predetermined axial failure value for monitoring fluid pressure in accordance with Euler's Law for slender columns.

The operation of the embodiment 210 is similar to that described hereinabove for the embodiments 10 and 110. Namely, excess fluid pressure, above a first predetermined value, acting on the closed end 32 of the piston forces the piston and spring-loaded valve means 246 upwardly as a unit, as viewed in the drawings, to open the inlet port 22. Fluid pressure is then impressed on the upstream face of the spring-loaded valve 48, but does not escape to the atmosphere or to the outlet port 215.

If the fluid pressure continues to rise, and exceeds a second predetermined value, the valve 48 is lifted off its seat 44 and permits a blow down of the fluid pressure through the piston and laterally outward through the valve outlet port 215 into a pipe or vessel, neither being shown, thus insuring that the environment or any adjacent equipment will not be contaminated by corrosive fluid contained by the vessel being monitored.

Obviously the invention is susceptible to changes or alterations without defeating its practicability. Therefore, I do not wish to be confined to the preferred embodiment shown in the drawings and described herein.

I claim:

1. A combined spring-loaded and pin released fluid pressure relief valve adapted to be connected with a vessel containing corrosive fluid under greater than atmospheric pressure, comprising:

an elongated valve body having inlet and outlet ports forming a fluid passageway through the body and having an upstream and a downstream inner peripheral annular shoulder adjacent each end portion, said body having an annular recess between the inlet port and the upstream annular shoulder;

first valve means including an elongated piston having valve seals at its respective end portions and extending downstream beyond the upstream annular shoulder and longitudinally slideable relative to the body and normally closing the inlet port, the downstream end portion of said piston having an axial bore communicating with lateral bores adjacent its upstream end for forming a piston fluid passageway across the position of the upstream annular shoulder;

an outstanding annular flange on the piston downstream end portion normally abutting the upstream annular shoulder;

spring biased reseating valve means connected with the piston flange for normally closing the piston bore at its downstream end and moveable with the piston as a unit toward the downstream annular shoulder in response to fluid pressure at the inlet port above a first predetermined value and opening the piston fluid passageway to the outlet port in response to fluid pressure above a second greater predetermined value; and, pin means including an elongated pin having an axial failure value not greater than said second predetermined fluid pressure supported at its respective end portions by said spring biased valve means and said valve body for normally maintaining said piston valve in inlet port closed position while the fluid pressure acting on the piston results in a force less than the failure value of the pin.

2. The relief valve according to claim 1 in which the pin means further includes:
- a centrally bored disk having a plurality of radial apertures axially secured to the inner periphery of the upstream annular shoulder;
- a like plurality of rods secured to said valve follower in circumferentially spaced relation and projecting down stream through the apertures in said disk;
- a centrally bored plate secured to the downstream end portions of said rods; and,
- a frangible bolt-like pin extending axially through the central bores of said disk and said plate for normally preventing downstream movement of said piston valve.

3. The relief valve according to claim 2 in which the spring biased valve means comprises:
- a downstream valve normally sealing with the piston downstream valve seat, said downstream valve having a downstream projecting valve stem;
- a valve stem follower telescopically receiving said valve stem and having a downstream diametrically enlarged portion longitudinally slideably guided by the wall forming the valve body fluid passageway;
- struts interposed between and securing the valve follower to said piston annular flange; and,
- a compression spring biasing said downstream valve toward said piston valve seat.

4. The relief valve according to claim 1 in which the pin means includes:
- a pin having a predetermined axial buckling point axially supported, at its respective end portions, by the sleeve cap and the downstream end portion of the valve follower.

5. The relief valve according to claim 4 in which the spring biased valve means comprises:
- a downstream valve normally sealing with the piston downstream valve seat, said downstream valve having a downstream projecting valve stem;
- a valve stem follower telescopically receiving said valve stem and having a downstream diametrically enlarged portion longitudinally slideably guided by the wall forming the valve body fluid passageway;
- struts interposed between and securing the valve follower to said piston annular flange; and,
- a compression spring biasing said downstream valve toward said piston valve seat.

6. The relief valve according to claim 1 in which the pin means includes:
- a plurality of elongated members axially projecting downstream from the downstream annular shoulder;
- a plate interconnecting the downstream end portions of said members; and,
- a pin having a predetermined buckling point axially extending between and supported by said valve follower and said plate.

7. The relief valve according to claim 6 in which the spring biased valve means comprises:
- a downstream valve normally sealing with the piston downstream valve seat, said downstream valve having a downstream projecting valve stem;
- a strut telescopically receiving said valve stem and projecting downstream beyond and slideably guided by said annular shoulder;
- an inverted T-shaped followers surrounding the downstream end portion of said shaft;
- struts interposed between and securing the follower to said piston annular flange; and,
- a compression spring biasing said downstream valve toward said piston valve seat.

8. The relief valve according to claim 1 in which the spring biased valve means comprises:
- a downstream valve normally sealing with the piston downstream valve seat, said downstream valve having a downstream projecting valve stem;
- a valve stem follower telescopically receiving said valve stem and having a downstream diametrically enlarged portion longitudinally slideably guided by the wall forming the valve body fluid passageway;
- struts interposed between and securing the valve follower to said piston annular flange; and,
- a compression spring biasing said downstream valve toward said piston valve seat.

9. The relief valve according to claim 7 in which the confronting fluid facing end surfaces of the upstream and downstream annular shoulders are equal whereby upstream and downstream fluid pressures are balanced.

10. The relief valve according to claim 1 in which said valve body is provided with a lateral bore communicating with the piston fluid passageway for testing the spring compression setting of said compression spring while said first valve means maintains the inlet port closed.

11. A fluid relief valve having in combination:
- a valve body having inlet and outlet ports forming a fluid passageway;
- pilot valve means providing visual indication of an opened inlet port at a first predetermined fluid pressure including a piston valve in the passageway having upstream and downstream valve seals at respective end portions and normally closing the inlet port,
- said piston having an axial fluid passageway in its downstream end portion;
- spring-loaded valve means for opening at a second predetermined fluid pressure axially connected with the piston valve and normally seated on the piston downstream valve seal for closing the piston fluid passageway while fluid pressure in the piston valve fluid passageway remains less than said second predetermined fluid pressure; and,
- pin means including an elongated pin having an axial failure value not greater than said first predetermined fluid pressure axially supported at its respective end portions by said spring-loaded valve means and said body for normally maintaining said piston valve in inlet port closed position while the fluid pressure acting on the piston valve results in a force less than the failure value of the pin.

12. The relief valve according to claim 11 in which the pin means further includes:
- a centrally bored disk having a plurality of radial apertures axially secured to the inner periphery of the upstream annular shoulder;
- a like plurality of rods secured to said valve follower in circumferentially spaced relation and projecting downstream through the apertures in said disk;
- a centrally bored plate secured to the downstream end portions of said rods; and,
- a frangible bolt-like pin extending axially through the central bores of said disk and said plate for normally preventing downstream movement of said piston valve.

13. The relief valve according to claim 12 in which the spring biased valve means comprises:
  a downstream valve normally sealing with the piston downstream valve seat, said downstream valve having a downstream projecting valve stem;
  a valve stem follower telescopically receiving said valve stem and having a downstream diametrically enlarged portion longitudinally slideably guided by the wall forming the valve body fluid passageway;
  struts interposed between and securing the valve follower to said piston annular flange; and,
  a compression spring biasing said downstream valve toward said piston valve seat.

14. The relief valve according to claim 11 in which the pin means includes:
  a pin having a predetermined axial buckling point axially supported, at its respective end portions, by the sleeve cap and the downstream end portion of said valve follower.

15. The relief valve according to claim 14 in which the spring biased valve means comprises:
  a downstream valve normally sealing with the piston downstream valve seat, said downstream valve having a downstream projecting valve stem;
  a valve stem follower telescopically receiving said valve stem and having a downstream diametrically enlarged portion longitudinally slideably guided by the wall forming the valve body fluid passageway;
  struts interposed between and securing the valve follower to said piston annular flange; and,
  a compression spring biasing said downstream valve toward said piston valve seat.

16. The relief valve according to claim 11 in which the pin means includes:
  a plurality of elongated members axially projecting downstream from the downstream annular shoulder;
  a plate interconnecting the downstream end portions of said members; and,
  a pin having a predetermined buckling point axially extending between and supported by said valve follower and said plate.

17. The relief valve according to claim 16 in which the spring biased valve means comprises:
  a downstream valve normally sealing with the piston downstream valve seat, said downstream valve having a downstream projecting valve stem;
  a valve stem follower telescopically receiving said valve stem and having a downstream diametrically enlarged portion longitudinally slideably guided by the wall forming the valve body fluid passageway;
  struts interposed between and securing the valve follower to said piston annular flange; and,
  a compression spring biasing said downstream valve toward said piston valve seat.

18. The relief valve according to claim 11 in which the spring biased valve means comprises:
  a downstream valve normally sealing with the piston downstream valve seat, said downstream valve having a downstream projecting valve stem;
  a valve stem follower telescopically receiving said valve stem and having a downstream diametrically enlarged portion longitudinally slideably guided by the wall forming the valve body fluid passageway;
  struts interposed between and securing the valve follower to said piston annular flange; and,
  a compression spring biasing said downstream valve toward said piston valve seat.

* * * * *